US007266125B2

United States Patent
Xu et al.

(10) Patent No.: US 7,266,125 B2
(45) Date of Patent: Sep. 4, 2007

(54) LANDMARK NUMBERING BASED AUXILIARY NETWORK FOR PEER-TO-PEER OVERLAY NETWORK

(75) Inventors: Zhichen Xu, Sunnyvale, CA (US); Mallik Mahalingam, Sunnyvale, CA (US); Magnus Karlsson, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1063 days.

(21) Appl. No.: 10/284,355

(22) Filed: Oct. 31, 2002

(65) Prior Publication Data

US 2004/0085329 A1    May 6, 2004

(51) Int. Cl.
*H04L 12/56* (2006.01)
*H04L 12/28* (2006.01)
(52) U.S. Cl. ........................ 370/401; 370/400
(58) Field of Classification Search ............... 370/229, 370/238, 238.1, 389, 396, 400, 401; 709/241
See application file for complete search history.

(56) References Cited

U.S. PATENT DOCUMENTS

| 6,584,093 | B1 * | 6/2003 | Salama et al. | 370/351 |
| 6,633,880 | B1 * | 10/2003 | Modelski et al. | 707/100 |
| 6,658,479 | B1 * | 12/2003 | Zaumen et al. | 709/238 |
| 6,842,615 | B2 * | 1/2005 | Angin | 455/432.1 |
| 7,111,074 | B2 * | 9/2006 | Basturk | 709/241 |
| 7,123,620 | B1 * | 10/2006 | Ma | 370/395.32 |
| 2001/0036183 | A1 * | 11/2001 | Melick et al. | 370/389 |
| 2003/0072485 | A1 * | 4/2003 | Guerin et al. | 382/166 |
| 2005/0204042 | A1 * | 9/2005 | Banerjee et al. | 709/226 |
| 2005/0281271 | A1 * | 12/2005 | Beshai et al. | 370/400 |

* cited by examiner

*Primary Examiner*—Ajit Patel

(57) ABSTRACT

A system and method for an auxiliary network for a peer-to-peer overlay network using landmark numbering. Using information available through the auxiliary network, expressway connections are established amongst expressway nodes and ordinary connections are established between ordinary and expressway nodes. The connections established is unconstrained and arbitrary. After the connections are established, efficient routing of information may take place.

30 Claims, 7 Drawing Sheets

600

LANDMARK NUMBERING BASED AUXILIARY NETWORK FOR PEER-TO-PEER OVERLAY NETWORK

RELATED APPLICATIONS

The following applications of the common assignee, incorporated by reference in its entirety, may contain some common disclosure and may relate to the present invention:

U.S. patent application Ser. No. 10/368,426, filed on Feb. 20, 2003 entitled "SUMMARIZING NODES IN ROUTE PROPOGATION IN AUXILIARY NETWORK FOR PEER-TO-PEER OVERLAY NETWORKS"; and U.S. patent application Ser. No. 10/284,100, filed on Oct. 30, 2002 entitled "AUTONOMOUS SYSTEM TOPOLOGY BASED AUXILIARY NETWORK FOR PEER-TO-PEER OVERLAY NETWORKS".

FIELD OF THE INVENTION

This invention relates generally to peer-to-peer ("P2P") overlay networks. In particular, the invention relates generally to auxiliary networks for P2P overlay networks using landmark numbering.

BACKGROUND OF THE INVENTION

Providing scalable and efficient content delivery is becoming more important as the demand for applications such as streaming media grows at an incredible rate. Content distribution Network ("CDN") and network service providers advocate using network overlays for providing scalable and robust Internet based applications. Typical overlays are administrator configured, and due to the centralized nature of the overlay construction process, it is not feasible to construct large overlays Recent application-level overlay networks, such as CAN, eCAN, Chord and PAST, are scalable and self-organizing in nature. Nodes in these networks collectively contribute towards a fault-tolerant and administration-free storage space. The basic functionality these systems provide is a distributed hash table ("DHT"). In these systems, an object is associated with a key. Every node in the system is responsible for storing objects whose keys map to the ID of the node (via hashing). Retrieving an object amounts to routing to a node that is responsible for storing that object. The routing path on these overlay networks is at the application-level rather than the IP level.

While elegant from a theoretical perspective, these systems suffer from two major limitations. First, they rely on application-level routing that largely ignores the characteristics of the underlying physical networks. Because the underlying physical characteristics are not taken into consideration, excessive routing delays typically result. Second, they construct a homogeneous structured overlay network, while in reality, the nodes usually have different constraints such as storage, load, packet forwarding capacities, and network connections.

In addition, the typical overlay networks are constrained. In other words, the number of connections for a node is fixed or limited. Because of the constraint, the ability to accurately model the underlying physical characteristics is limited as well. Further, the earlier auxiliary networks do not handle the dynamic nature of the nature of the underlying network well, for example, when nodes exit and new nodes enter the network.

SUMMARY OF THE INVENTION

According to an embodiment of the present invention, a landmark numbering based auxiliary network for a peer-to-peer overlay network may include a plurality of expressway nodes in a landmark space, wherein one or more expressway nodes in the landmark space are configured to establish a number of expressway connections with one or more other expressway nodes such that a number of established expressway connections is arbitrary for each of the one or more expressway nodes. The auxiliary network may also include a plurality of ordinary nodes in the landmark space, wherein one or more ordinary nodes in the space are configured to establish a number of ordinary connections with the one or more expressway nodes.

According to another embodiment of the present invention, a method to construct a landmark numbering based auxiliary network for a peer-to-peer overlay network may include determining a landmark space and establishing a number of expressway connections between one or more expressway nodes and one or more other expressway nodes such that a number of established expressway connections is arbitrary for each of the one or more expressway nodes. The method may also include establishing a number of ordinary connections between one or more ordinary nodes and the one or more expressway nodes.

According to yet another embodiment of the present invention, a method of mapping information of a higher-dimension auxiliary network on to a lower-dimension default overlay, wherein the auxiliary network includes a plurality of expressway nodes in a landmark space, wherein expressway connections are established amongst a plurality of expressway nodes based on respective positions of the plurality of expressway nodes such that a number of expressway connections established by each of the one or more expressway nodes is arbitrary and wherein ordinary connections are established between a plurality of ordinary nodes in the landmark space and the plurality of expressway nodes, the method may include partitioning the landmark space may be partitioned in to $2^{nx}$ grids of equal size, wherein n refers to the number of landmark nodes and x controls the number of grids used to partition the landmark space; landmark numbering each expressway node by numbering each expressway node according to the grid the expressway node falls into; partitioning the overlay into corresponding grid; and storing information of each expressway node in the grid corresponding to the landmark number.

BRIEF DESCRIPTION OF THE DRAWINGS

Features of the present invention will become apparent to those skilled in the art from the following description with reference to the drawings, in which.

DETAILED DESCRIPTION

For simplicity and illustrative purposes, the principles of the present invention are described by referring mainly to exemplary embodiments thereof. However, it is to be understood that the same principles are equally applicable to many types of auxiliary network for P2P overlay networks.

In an embodiment of the present invention, an existing overlay network, such as CAN, eCAN, Tapestry, Chord, Pastry, and the like, may be augmented with an auxiliary network to improve performance (for example, routing performance). The auxiliary network, also termed "expressway network", allows the heterogenic conditions, i.e. characteristics of the underlying physical networks, to be exploited. In the expressway network, heterogenic conditions such as physical proximity, forwarding capacity, and connectivity of the nodes of the network may be taken into account. Also, unlike the previous networks, the expressway network may be unconstrained.

As mentioned above, examples of overlay networks are CAN and eCAN. With CAN, the problem of data placement/retrieval over large-scale storage systems is abstracted as hashing that maps keys onto values. CAN organizes the logical space as a d-dimensional Cartesian space (a d-torus). The Cartesian space is partitioned into zones, with one or more nodes serving as owner(s) of a zone. An object key is a point in the space, and the node owns the zone that contains the point owns the object. Routing from a source node to a destination node boils down to routing from one zone to another in the Cartesian space. Node addition corresponds to picking a random point in the Cartesian space, routing to the zone that contains the point, and splitting the zone with its current owner(s). Node removal amounts to having the owner(s) of one of the neighboring zone take over the zone owned by the departing node. In CAN, two zones are neighbors if they overlap in all but one dimension along which they neighbor each other.

eCAN augments CAN's routing capacity with routing tables of larger span. Every k CAN zones represent an order-1 zone, and k order-i zones represents an order-i+1 zone. The variable k is called the zone coverage factor. As a result, a node is an owner of a CAN zone and is also resident of the high-order zones that encompass the CAN zone. Besides its default routing neighbors that are CAN zones, a node also has high-order routing neighbors that are representatives of its neighbors in the high-order zones. eCAN provides flexibility in selecting the high-order neighbors. When selecting a representative for a high-order neighbor, a node may be selected that is closest to the current node amongst all the nodes that belong to the neighboring high-order zone.

Figure 1:
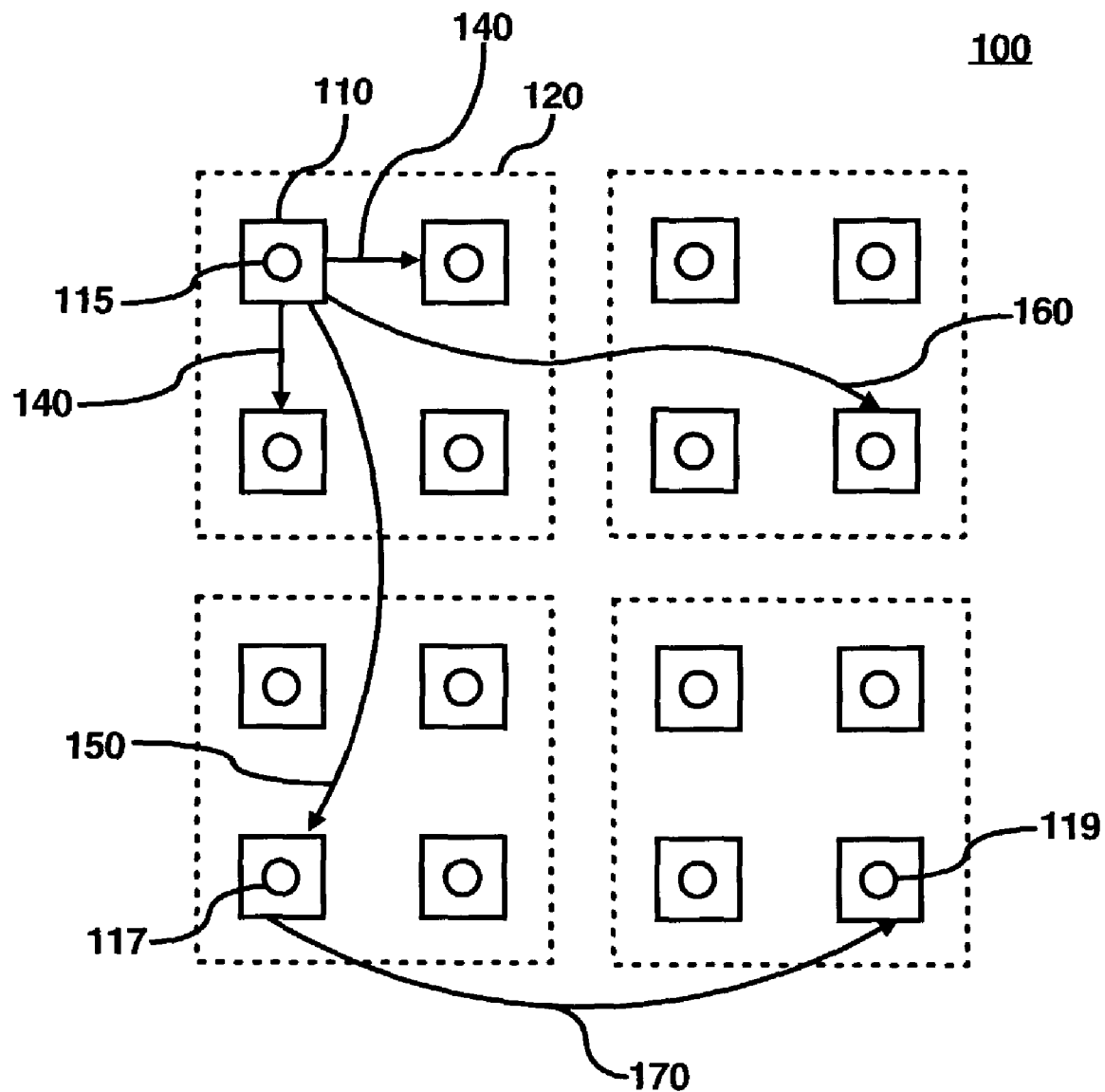
FIG. 1 is an exemplary diagram illustrating a conventional eCAN overlay network.

FIG. 1 illustrates an exemplary eCAN 100. The eCAN 100 includes default CAN zones 110, and in this example, each default CAN zone 110 is 1/16 of the entire Cartesian space. Also, four neighboring default zones 110 make one order-2 eCAN zone 120. Thus, in this example, there are sixteen default zones 110 and four order-2 zones 120. While not shown, the neighboring order-2 zones may be used to construct order-3 zones, order-3 zones used to construct order-4 zones, and so on.

In addition, a node may own a particular default CAN zone. In this instance, the node 115 owns the CAN zone 110 in the upper left. In addition, a node is a resident of the higher order zones that encompass the particular default zone. The routing table of node 115 includes a default routing information of CAN (represented as arrows 140) that link only to the immediate neighbors of node 115. The routing table also includes high-order routing information (represented as arrows 150 and 160) that link to nodes of neighboring eCAN zones 120 and 130. In this example, node 115 may reach node 119 using eCAN routing (115, 117, 119).

In an embodiment of the present invention, using an auxiliary network like the expressway network, the heterogeneity of nodes may be represented without altering the overlay network like CAN and eCAN. In other words, the characteristics of the underlying physical network is taken into consideration. However, it should be noted that the expressway network may be used to augment many types overlay networks and is not limited to CAN and eCAN.

In the expressway network, each node may establish connections to nodes in its physical proximity that are well-connected and have good forwarding capacities. For example, routers and gateways and the nodes that are near to the routers and gateways are better suited to forward packets. Forwarding capacities typically refers to network bandwidth and packet processing abilities. These well-connected nodes are called expressway nodes. The expressway nodes themselves may be linked to other expressway nodes that are close by called expressway neighbors to form an expressway.

The expressway may be used to route information in the network. Note that the number of expressway links from a particular expressway node to other expressway nodes is unconstrained. Thus, unlike the prior art, the number of expressway links established by each expressway node is arbitrary and perhaps different for each expressway node.

For a given default overlay network such as eCAN, a corresponding expressway network may be constructed in many different ways. When constructing the expressway network, expressway nodes are selected. The expressway nodes form connections between themselves to form expressways. While not exhaustive, the expressway nodes typically may serve the following purposes: (1) to propagate routing information when nodes join or leave or when the network conditions change; (2) to resolve the routing destinations; and (3) to forward information packets for multicasting or for better IP routing performance.

In an embodiment of the present invention, landmark numbering may be used to form the expressways. In the expressway network utilizing landmark numbering, a plurality of nodes that are randomly scattered throughout a network (like the Internet) may be chosen as landmark nodes. Examples of landmark nodes may be a gateway server in Washington, D.C. and a router in Palo Alto, Calif. The landmark nodes may be a part of the overlay network or may be standalone.

In an embodiment of the present invention, each expressway node may determine its position relative to the landmark nodes by measuring its distance from each of the landmark nodes. For example, if there are n landmark nodes, then for a node A, the measured distance from the node A to the landmark nodes may be represented by a sequence $<d_1, d_2, \ldots, d_n>$ wherein $d_1$ is the distance from node A to the first landmark node, $d_2$ is the distance from node A to the second landmark node, and so on. The node A then may be viewed as being positioned in an n-dimension Cartesian space using the sequence $<d_1, d_2, \ldots, d_n>$ as its coordinates.

In other words, the landmark nodes serve as axis of the Cartesian coordinate system. This Cartesian space is termed the landmark space.

The nodes that are close to each other should have similar landmark measurements. Therefore, using the positional information, connections between nodes may be established to enhance performance and/or minimize cost. For example, it is probable that communications performance will be faster, more reliable and cheaper between nodes that are close to each other than between two nodes that are relatively far from each other.

Figure 2:
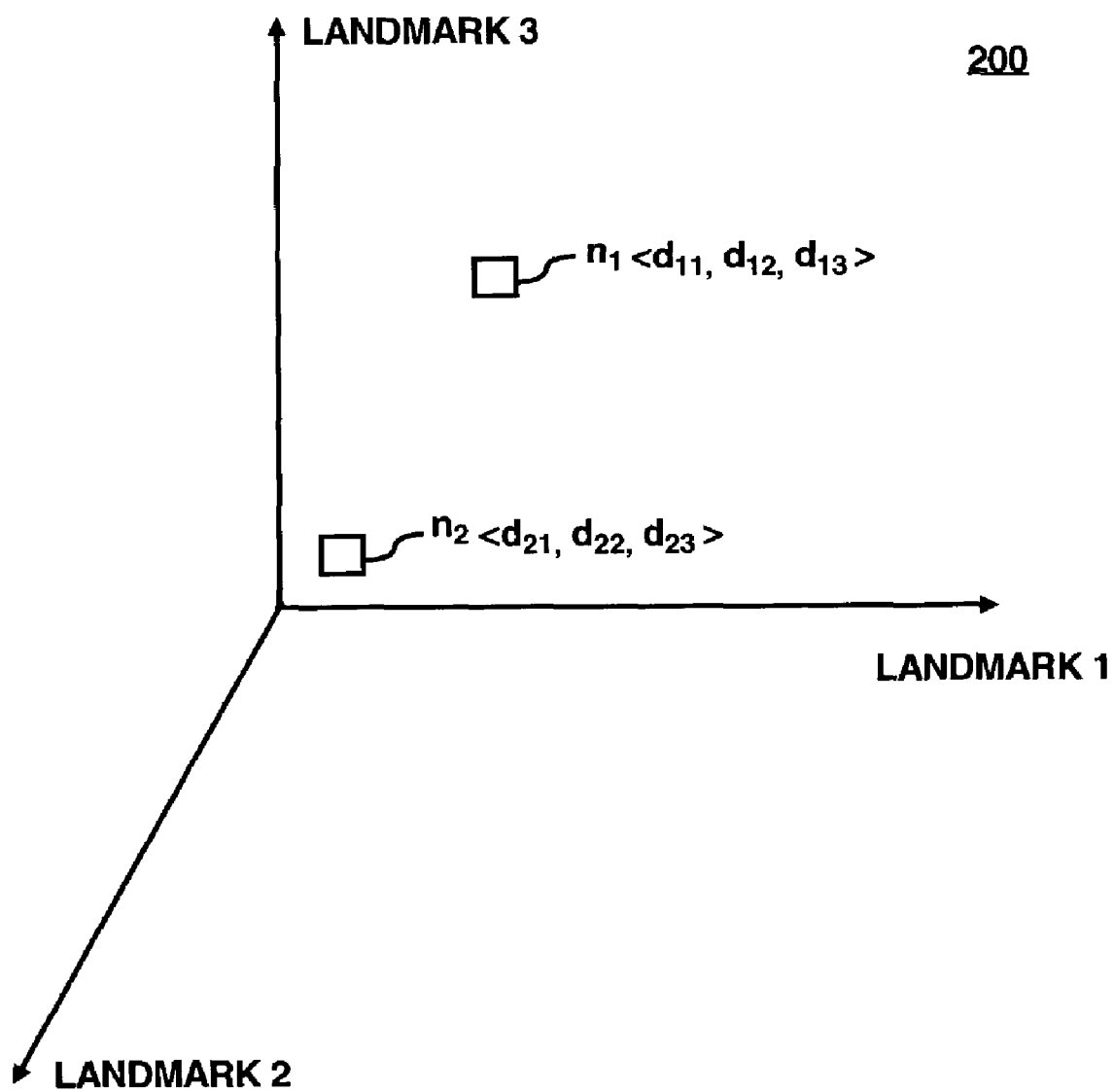
FIG. 2 illustrates a landmark space according to an embodiment of the present invention.

FIG. 2 illustrates an exemplary landmark space 200 using three landmark nodes. As shown in FIG. 2, the three landmark nodes—landmark1, landmark2 and landmark3—serve as the basis of the coordinate axes of the landmark space. The landmark space 200 includes two nodes $n_1$ and $n_2$ with coordinates $<d_{11}, d_{12}, d_{13}>$ and $<d_{21}, d_{22}, d_{23}>$, respectively. How close the nodes $n_1$ and $n_2$ are to each other may be determined based on their respective coordinate values.

Note that there are variety of ways to determine distances and therefore positions of the nodes $n_1$ and $n_2$. One example of distance measurement is the simple geographical distance. In this coordinate system, the node $n_1$ for example (which may be an expressway or an ordinary node) will have as coordinate values the geographical distances from the landmark nodes. For example, the coordinate sequence $<d_{11}, d_{12}, d_{13}>$ of the node $n_1$ of FIG. 2 may have values $<30$ meters, 27 meters, 48 meters$>$ as distances from the landmark nodes.

In another example, latencies may be used as a measure of distance. For example, the same coordinate sequence $<d_{11}, d_{12}, d_{13}>$ of the node $n_1$ of FIG. 2 may have values $<2$ milliseconds, 4 milliseconds, 7 milliseconds$>$. If the coordinate sequence of the node $n_2$ have similar latency values, it may be inferred that the nodes $n_1$ and $n_2$ are close to each other. Indeed, if it is desired that average performance of the network be optimized, using latency as the basis for measuring distances may be most natural.

Yet another way to measure distances may be to use peak latencies. This may be the measurement of choice if it is desired to guarantee a minimum level of service performance by the network. Still other ways to measure distances include average or mean latency, number of network hops, number of autonomous system hops, and the like. Note the examples of ways to measure distances provided above are not exhaustive.

Figure 3B:
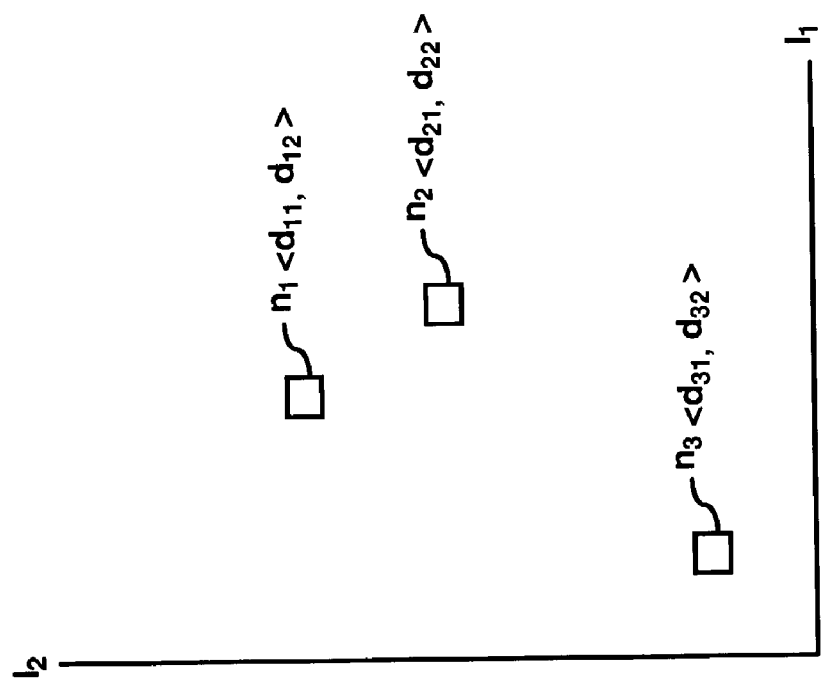
FIGS. 3A and 3B illustrates false clustering according to an embodiment of the present invention.
Figure 3A:
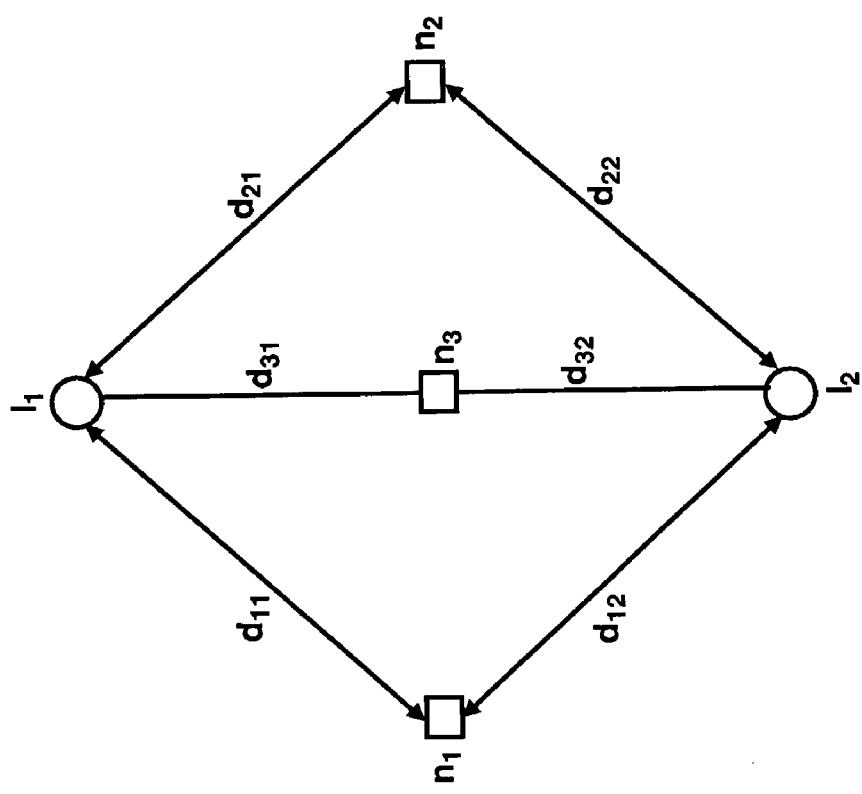

No matter the basis for measurement of distances, it is desirable that a sufficient number of landmark nodes be chosen. As more landmark nodes are chosen, probability of false clustering is reduced. FIGS. 3A and 3B are exemplary diagrams 300-A and 300-B, respectively, illustrating the concept of false clustering. As shown, diagram 300-A includes two landmark nodes $l_1$ and $l_2$ and three nodes $n_1$, $n_2$ and $n_3$. Also shown are distances of the three nodes to the landmark nodes. Note that the distances $d_{11}$ (between $n_1$ and $l_1$) and $d_{12}$ (between $n_2$ and $l_2$) are more similar to the distances $d_{21}$ (between $n_2$ and $l_1$) and $d_{22}$ (between $n_2$ and $l_2$) when compared to distances $d_{31}$ (between $n_3$ and $l_1$) and $d_{32}$ (between $n_3$ and $l_2$). When the corresponding landmark space is created as in diagram 300-B, the node $n_1$ appears to be closer to node $n_2$ when compared to node $n_3$, when in reality, node $n_2$ is actually closer to node $n_1$, i.e. false clustering has occurred. However, as more landmark nodes are added, instances of false clustering become less frequent.

Using the landmark nodes, each expressway node may determine its position within the landmark space. After determining the position, the expressway node may publish its position using the default overlay. An expressway node may determine its proximity to other expressway nodes based on the published positions. Based on the proximity information, the expressway node may establish an expressway connection with another expressway node.

While not exhaustive, the following are some example criteria that determine when a particular expressway node may establish an expressway connection with one or more other expressway nodes. One example is that the particular expressway node may establish expressway connections with a pre-determined number of the closest other expressway nodes. Note that the pre-determined number may be one. Also note that the pre-determined number may be different for each expressway node, i.e. is arbitrary. Another example is that the particular expressway node may establish expressway connections with all other expressway nodes that are within a pre-determined distance from itself. Again, the pre-determined distance may be different for each expressway node.

Indeed, the criteria may be a combination. For example, an expressway node may always establish a pre-determined minimum number of connections, but may also establish connections with all other expressway nodes within a pre-determined distance.

Similarly, an ordinary node may determine its proximity to expressway nodes based on the published positions. Based on the proximity information, each ordinary node may establish ordinary connections with expressway nodes in a similar manner as described above. The criteria used establish the ordinary connections may be individualized for each ordinary node.

Figure 4:
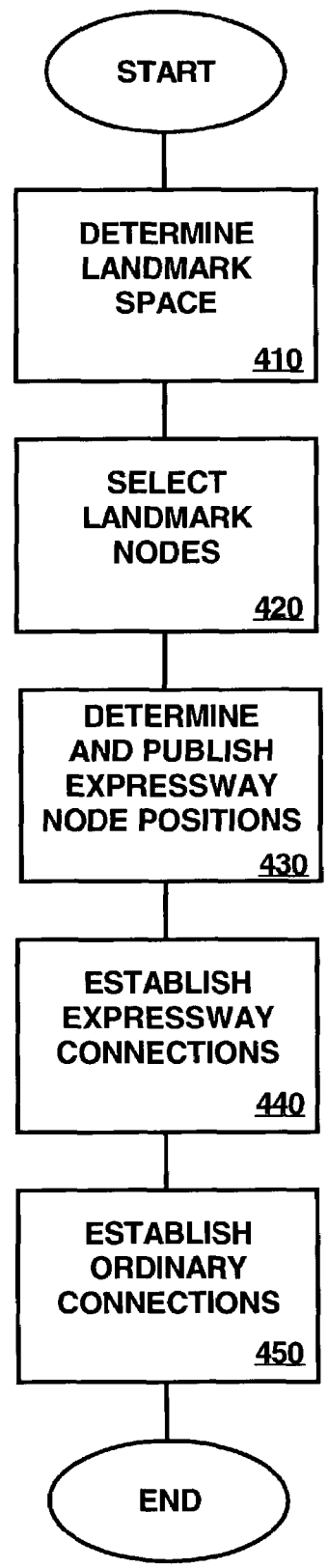
FIG. 4 illustrates an exemplary method to construct a landmark numbering based auxiliary network according to an embodiment of the present invention.

FIG. 4 is a flow diagram illustrating an exemplary method 400 to construct a landmark numbering based auxiliary network. As shown in FIG. 4, the method 400 may include the steps of determining landmark space (410) and selecting landmark nodes (420). The method 400 may also include determining and publishing the positions of the expressway nodes (430). The method 400 may further include establishing the expressway connections (430) and ordinary connections (440) based on the published positions.

Using the expressway network, the position information of the nodes may be used to determine which nodes will be linked to which other nodes. However, to actually establish the connections, the default overlay network may be used. This is because the default overlay provides an abstraction of a distributed hash table (DHT).

As mentioned above, typical P2P overlay networks provide hash tables. In these overlays, an object may be associated with a key. Every node in the network may store objects whose keys map to the ID of the node. Retrieving an object amounts to routing to a node which stores that object. Thus, to establish a connection with a node, the position information of the expressway nodes, which is in the landmark space, should be translated to a key in a hash tables of the overlay network. This translation should preserve certain properties. That is if two points are close to each other in the landmark space, then they should be translated to two keys that are close to each other in e.g., the numerical space. Once the key is determined, the ID of the desired node may be retrieved using the key of a requesting node and the connection may be established.

However, the landmark space is of relatively high dimension (for example, 3) and the overlay itself is of relatively low dimension (for example, 2). Thus, translating the landmark space of a higher dimension to an overlay of lower dimension while preserving the proximities becomes an issue. To address this issue, a space-filling curve technique may be used. Other techniques, such as locally linear embedding, may be used to translate information from a relatively higher dimension to a relatively lower dimension as well.

Figure 5B:
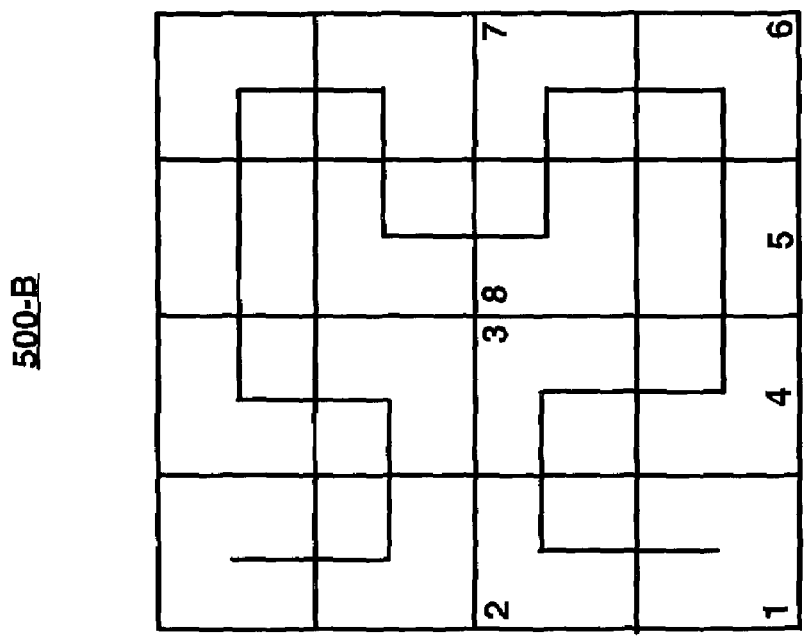
FIGS. 5A and 5B illustrate a space-filling curve according to an embodiment of the present invention.
Figure 5A:
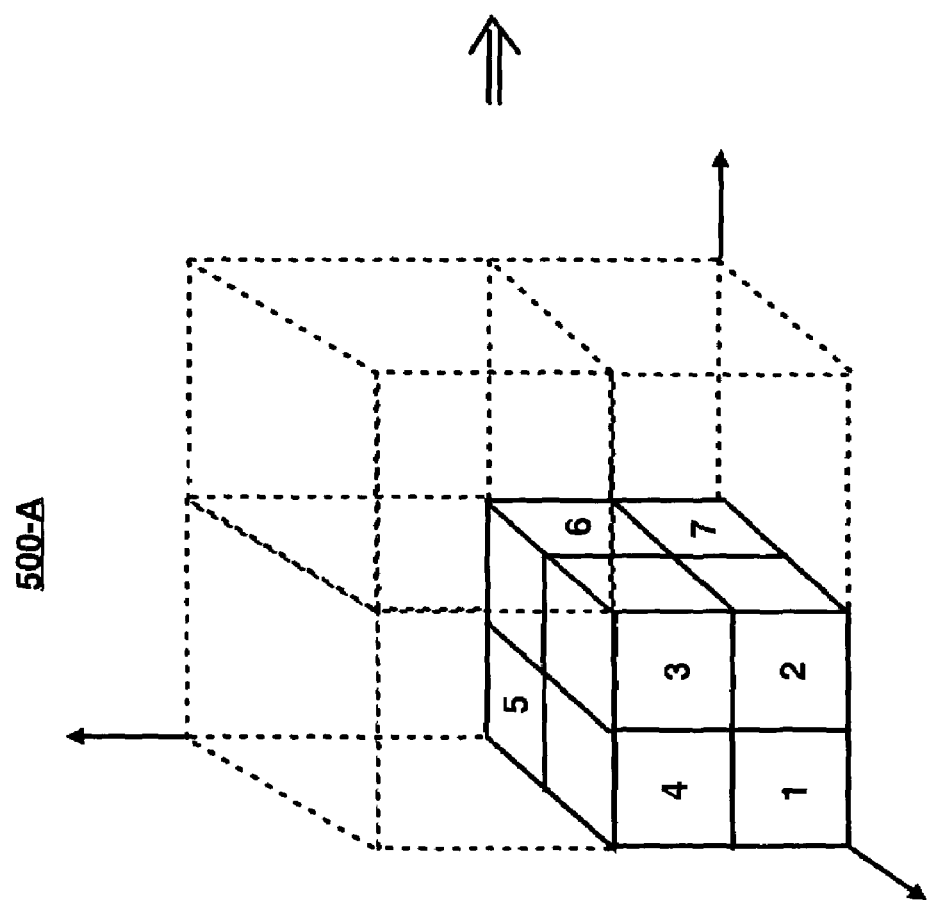

FIGS. 5A and 5B are exemplary diagrams illustrating the space-filling curve technique. In this technique, the space-filling curves map points in the domain $R^1$ (the domain of real numbers) into $R^d$ (a d-dimensional Cartesian space) so that the closeness relationship among the points is preserved. In other words, if two points are close to each in $R^d$, they are also close in $R^1$.

An example of the space-filling curve is the Hilbert Curve as shown in FIGS. 5A and 5B. Here, the three-dimensional landmark space 500-A including nodes 1-8 as shown in FIG. 5A are stored in a two-dimensional domain, for example the default overlay 500-B, as shown in FIG. 5B. The points along the curve in the two dimensional domain maintain the closeness relationship present in the three-dimensional landmark space. Note that the translation may be from any higher dimension to any lower dimensions and not limited to from three to two dimensions.

In general, the translation may be as follows: The landmark space may be partitioned in to $2^{nx}$ grids of equal size, wherein n refers to the number of landmark nodes and x controls the number of grids used to partition the landmark space. Each expressway node may be numbered according to what grid it falls into. This is referred to as landmark number of the node. Closeness in the landmark number indicates closeness in the landmark space. Also, smaller the x, the likelihood that two nodes will have the same numbering is larger. The overlay may be partitioned in grids as well and the information about the expressway nodes may be stored in a grid depending on its landmark numbering, again using the space-filling curve.

Note that when the higher dimensioned landmark space is translated to the lower-dimensioned default overlay using the space-filling curve, the information about the landmark space is stored on the default overlay itself including relative proximity information of the nodes. In this circumstance, it is possible to build a fully-connected expressway using the landmark space information stored on the default overlay. In a fully-connected expressway, given two expressway nodes, a path that connects the two nodes may always be found including all intermediate expressway nodes.

In this approach, each node (expressway or ordinary) may connect to a number of other nodes whose landmark numbers are numerically close to its landmark number. An advantage of this approach is that the operation is completely decentralized. In other words, the process may be completed without centralized coordination. The nodes that store the landmark information serve as rendezvous point for relevant nodes to get information of each other.

Under this approach, an ordinary nodes may locate an expressway node that is closest by: (i) computing its own landmark number; (ii) using its landmark number as a key to route to a destination location where information about other nodes that have similar landmark numbers are stored; and (iii) performing a controlled flooding starting from the destination location until information for some expressway node is encountered.

Control flooding may be viewed as visiting neighbors of the destination node until a certain radius (in terms of logical routing hops) is reached. In an embodiment of the present invention, controlled flooding can be used to find relevant information because information about close-by nodes is stored close to each other on the overlay.

Figure 6:
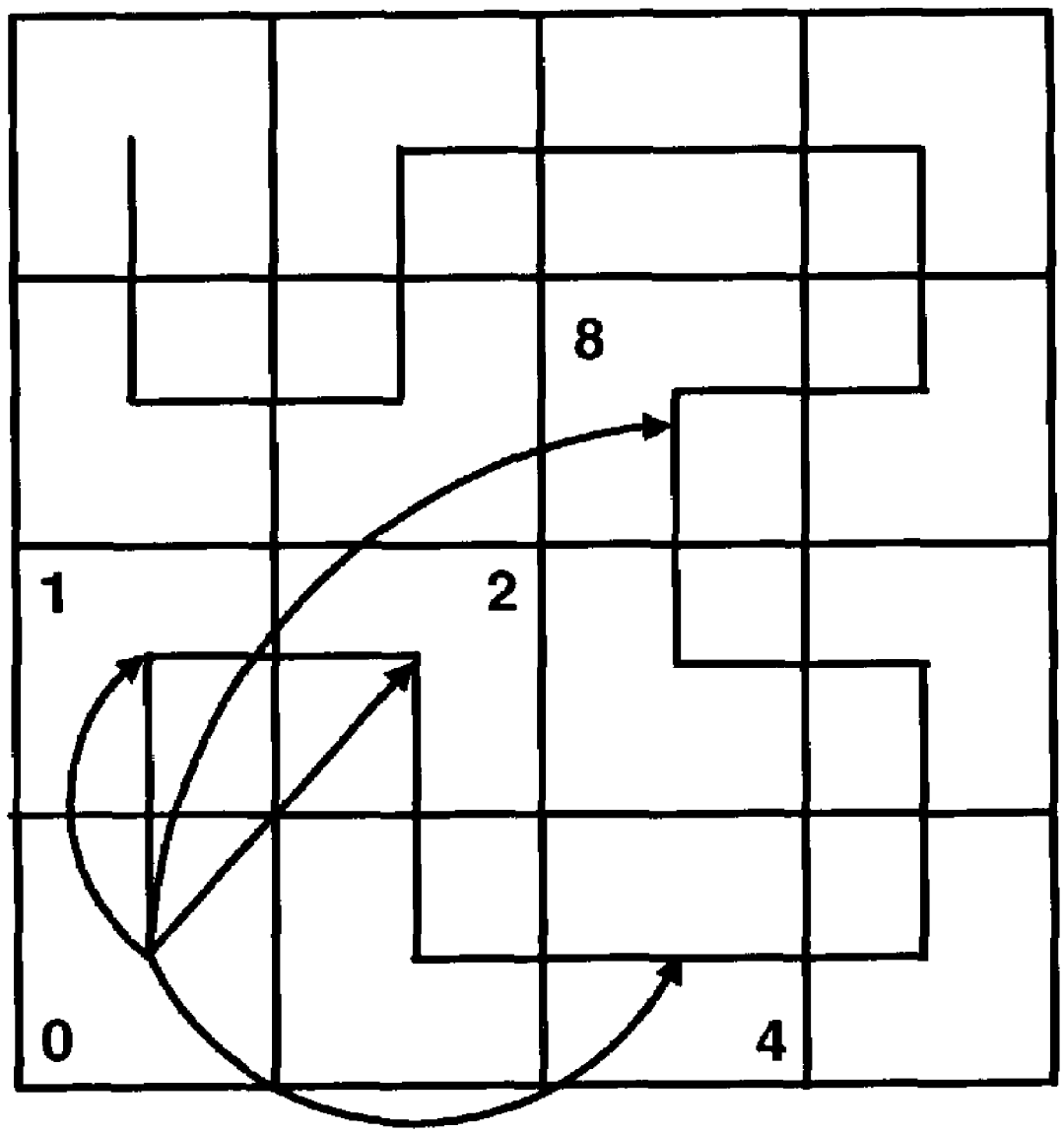
FIG. 6 illustrate a fully-connected expressway using a landmark space stored on a default overlay according to an embodiment of the present invention.

FIG. 6 is an exemplary diagram 600 illustrating how a fully-connected expressway may be built using the landmark space stored on the default overlay. The basic approach is for nodes in a particular landmark number select their expressway neighbors based on landmark numbers that are $2^i$ distances from the current node's landmark number number. For example, as shown in FIG. 5, nodes in landmark number 0 (lower left of FIG. 5), may select expressway neighbors in landmark number 1 ($2^0$), number 2 ($2^1$), number 4 ($2^2$), number 8 ($2^3$) and so on. While not shown, nodes in a landmark number may select and establish connections with any other nodes in the same landmark number.

Figure 7:
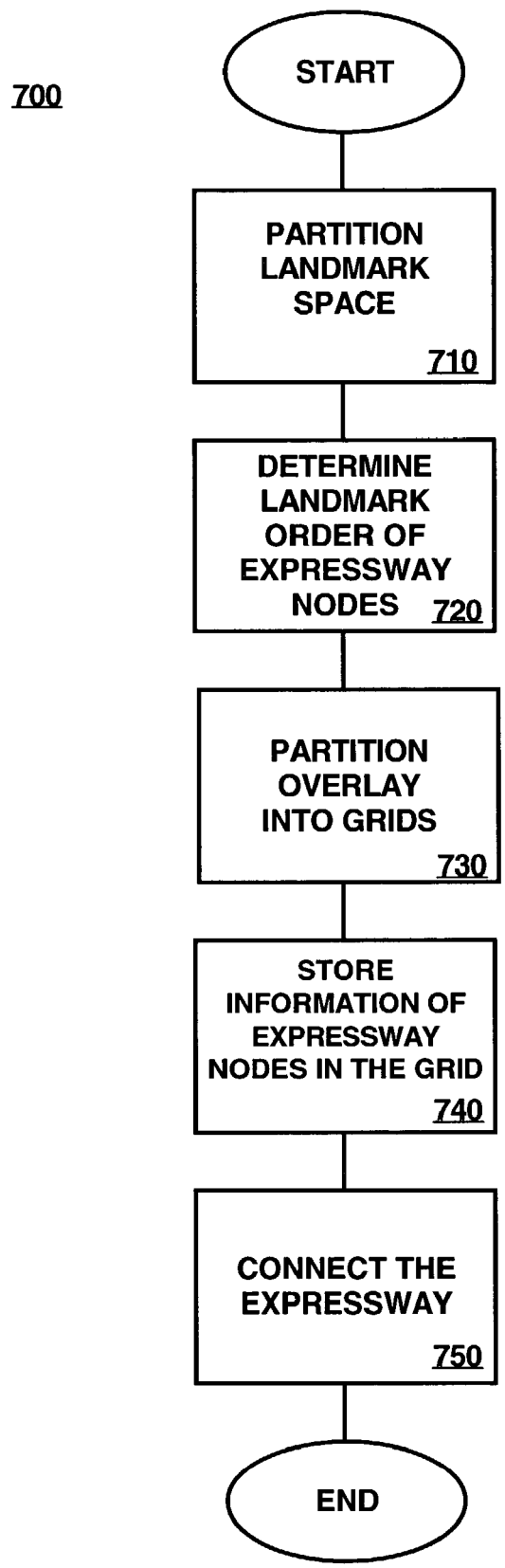
FIG. 7 illustrates an exemplary method to construct a fully-connected expressway an embodiment of the present invention.

FIG. 7 is a graph illustrating an exemplary method 700 to map a higher dimension network to a lower dimension overlay and to construct a fully-connected expressway. As shown, the method 700 may includes steps to partition the landmark space (710) to grids of equal size and to determine the landmark numbers of the expressway nodes (720). The method 700 may also include steps to partition the overly into corresponding grids (730) and to store information of expressway nodes in the grids corresponding to landmark numbers (740). The method may further include fully-connecting the expressway in a manner described above and illustrated in FIG. 6.

Through landmark clustering, the expressway auxiliary network may more accurately reflect the physical nature of the underlying network. Also, the expressway network is unconstrained. As a result, routing performance may be enhanced.

In an embodiment of the present invention, the routing state may be summarized to maintain the amount of routing information at a reasonable level. For example, the entire d-dimension Cartesian space may be divided into a plurality of grids of equal size. When a node joins an expressway, it advertises its position relative to the grid falls into instead of advertising its position directly. In this manner, the amount of routing information may be minimized, i.e. the routing table size may be maintained at a smaller size. However, the trade off is lesser routing performance.

While the invention has been described with reference to the exemplary embodiments thereof, it is to be understood that various modifications may be made to the described embodiments of the invention without departing from the spirit and scope of the invention. The terms and descriptions used herein are set forth by way of illustration only and are not meant as limitations. In particular, although the methods of the present invention has been described by examples, the steps of the method may be performed in a different order than illustrated or may be performed simultaneously. These and other variations are possible within the spirit and scope of the invention as defined in the following claims and their equivalents.

The invention claimed is:

1. A landmark numbering based auxiliary network for a peer-to-peer overlay network, comprising:
   a plurality of expressway nodes in a landmark space, wherein one or more expressway nodes in the landmark space are configured to establish a number of expressway connections with one or more other expressway nodes such that a number of established expressway connections is arbitrary for each of the one or more expressway nodes, wherein the number of expressway connections are established based on respective positions of the one or more expressway nodes and the one or more other expressway nodes; and
   a plurality of ordinary nodes in the landmark space, wherein one or more ordinary nodes in the space are configured to establish a number of ordinary connections with the one or more expressway nodes;

wherein the auxiliary network uses a coordinate system based on positions of a plurality of landmark nodes in the landmark space.

2. The auxiliary network of claim 1, wherein coordinate values representing the positions of the one or more expressway nodes correspond to respective distances of each of the one or more expressway nodes to each landmark node.

3. The auxiliary network of claim 2, wherein the distances are based on at least one of a geographical distance and latency.

4. The auxiliary network of claim 2, wherein each of the one or more expressway nodes is configured to:

determine a position of itself within the landmark space; and publish the position of itself over the overlay network.

5. The auxiliary network of claim 4, wherein each of the one or more expressway nodes is configured to:

determine a proximity of itself to the one or more other expressway nodes based on the published positions; and establish the expressway connections with the one or more other expressway nodes based on the proximity.

6. The auxiliary network of claim 5, wherein each of the one or more expressway nodes is configured to establish the expressway connections with a pre-determined number of the closest of the one or more other expressway nodes, wherein the pre-determined numbers are not necessarily the same for each of the one or more expressway nodes.

7. The auxiliary network of claim 5, wherein each of the one or more expressway nodes is configured to establish the expressway connections with the one or more other expressway nodes that are within a pro-determined distance value, wherein the predetermined distances are not necessarily the same for each of the one or more expressway nodes.

8. The auxiliary network of claim 4, wherein each of the one or more expressway nodes is configured to:

translate the published positions of the one or more other expressway nodes to correlating keys in one or mare hash tables of the overlay network; and establish the expressway connections with the one or more other expressway nodes based on entries in the one or more hash tables corresponding to the keys.

9. The auxiliary network of claim 8, wherein each of the one or more expressway nodes is configured to translate using a space-filling curve.

10. The auxiliary network of claim 4, wherein each of the one or more ordinary nodes is configured to:

determine a proximity of itself to the one or more expressway nodes based on the published positions; and establish ordinary connections with the one or more expressway nodes based on the proximity.

11. The auxiliary network of claim 4, each of the one or more ordinary nodes is configured to:

translate the published positions of the one or more expressway nodes to correlating keys in one or more hash tables of the overlay network; and establish the ordinary connections with the one or more expressway nodes based on entries in die one or more hash tables corresponding to the keys.

12. The auxiliary network of claim 1, wherein the number of established ordinary connections is arbitrary for each of the one or more ordinary nodes.

13. The auxiliary network of claim 1, wherein the number of ordinary connection for each of the one or more ordinary nodes are established based on respective positions of the one or more ordinary nodes and the one or more expressway nodes.

14. A method to construct a landmark numbering based auxiliary network for a peer-to-peer overlay network, the method comprising:

determining a landmark space;

establishing a number of expressway connections between one or more expressway nodes and one or more other expressway nodes such that a number of established expressway connections is arbitrary for each of the one or more expressway nodes, wherein the number of expressway connections are established based on respective positions of the one or more expressway nodes and the one or more other expressway nodes;

establishing a number of ordinary connections between one or more ordinary nodes and the one or more expressway nodes; and using a coordinate system based on positions of a plurality of landmark nodes in the landmark space.

15. The method of claim 14, wherein coordinate values representing the positions of the one or more expressway nodes correspond to respective distances of each of the one or more expressway nodes to each landmark node.

16. The method of claim 15, wherein the distances are based on at least one of a geographical distance and latency.

17. The method of claim 15, further comprising:

determining a position of each of the one or more expressway nodes within the landmark space; and publishing the position of itself over the overlay network.

18. The method of claim 17, further comprising:

determining a proximity of each of the one or more expressway nodes to the one or more other expressway nodes based on the published positions; and establishing the number of expressway connections for each of the one or more expressway nodes with the one or more other expressway nodes based on the proximities.

19. The method of claim 18, wherein the step of establishing the number of expressway connections include establishing the number of expressway connections for each of the one or more expressway nodes with a pre-determined number of the closest of the one or more other expressway nodes, wherein the pre-determined numbers are not necessarily the same for each of the one or more expressway nodes.

20. The method of claim 18, wherein the step of establishing the number of expressway connections include establishing the number of expressway connections for each of the one or more expressway nodes with the one or more other expressway nodes that are within a pre-determined distance value, wherein the pre-determined distances are not necessarily the same for each of the one or more expressway nodes.

21. The method of claim 17, further comprising:

translating the published positions of the one or more other expressway nodes to correlating keys in one or more hash tables of the overlay network; and establish the expressway connections for each of the one or more expressway nodes with the one or more other expressway nodes based on entries in the one or more hash tables corresponding to the keys.

22. The method of claim 21, wherein the step of translating the published positions include translating using a space-filling curve.

23. The method of claim 17, further comprising:
determine a proximity of each of the one or more ordinary nodes to the one or more expressway nodes based on the published positions; and
establishing the number of ordinary connections for each of the one or more ordinary nodes with the one or more expressway nodes based on the proximity.

24. The method of claim 17, further comprising:
translating the published positions of the one or more expressway nodes to correlating keys in one or more hash tables of the overlay network; and
establish the number of ordinary connections for each of the one or more ordinary nodes with the one or more expressway nodes based on entries in the one or more hash tables corresponding to the keys.

25. The method of claim 14, wherein the number of established ordinary connections is arbitrary.

26. The method of claim 14, wherein the number of ordinary connection for each of the one or more ordinary nodes are established based an respective positions of the one or more ordinary nodes and the one or more expressway nodes.

27. A method of mapping information of a higher-dimension auxiliary network on to a lower-dimension default overlay, wherein the auxiliary network comprises a plurality of expressway nodes in a landmark space, wherein expressway connections are established amongst a plurality of expressway nodes based on respective positions of the plurality of expressway nodes such that a number of expressway connections established by each of the one or more expressway nodes is arbitrary and wherein ordinary connections are established between a plurality of ordinary nodes in the landmark space and the plurality of expressway nodes, the method comprising:
partitioning the landmark space into $2^{nx}$ grids of equal size, wherein n refers to a number of landmark nodes and x refers to a number of grids used to partition the landmark space;
determining a landmark number for each expressway node by numbering each expressway node according to the grid the expressway node falls into;
partitioning the overlay into corresponding grids; and
storing information for each expressway node in the grid corresponding to the landmark number.

28. The method of claim 27, wherein the step of storing information includes using a space-filling curve.

29. The method of claim 27, further comprising:
fully connecting an expressway.

30. The method of claim 29, wherein the step of fully connecting the expressway comprises:
selecting a node;
connecting the node with one or more expressway nodes in the same landmark number as the node; and
connecting the nodes with one or more expressway nodes in one or more landmark numbers that are $2^i$ distance away from the node.

* * * * *

UNITED STATES PATENT AND TRADEMARK OFFICE
CERTIFICATE OF CORRECTION

PATENT NO. : 7,266,125 B2
APPLICATION NO. : 10/284355
DATED : September 4, 2007
INVENTOR(S) : Zhichen Xu et al.

It is certified that error appears in the above-identified patent and that said Letters Patent is hereby corrected as shown below:

In column 5, line 56, delete "$n_2$" and insert -- $n_1$ --, therefor.

In column 9, line 36, in Claim 7, delete "pro-determined" and insert -- pre-determined --, therefor.

In column 9, line 42, in Claim 8, delete "mare" and insert -- more --, therefor.

In column 9, line 63, in Claim 11, delete "die" and insert -- the --, therefor.

Signed and Sealed this

Twenty-second Day of July, 2008

JON W. DUDAS
*Director of the United States Patent and Trademark Office*